April 21, 1964 R. MEES 3,129,633
FILM GUIDE MEANS FOR CINEMATOGRAPHIC PROJECTORS
Filed Sept. 23, 1960 2 Sheets-Sheet 2

INVENTOR
ROBERT MEES
BY Toulmin & Toulmin
Attorneys

United States Patent Office 3,129,633
Patented Apr. 21, 1964

3,129,633
FILM GUIDE MEANS FOR CINEMATOGRAPHIC PROJECTORS
Robert Mees, Wissmar, Germany, assignor to Ernst Leitz Gesellschaft mit beschrankter Haftung, Wetzlar (Lahn), Germany
Filed Sept. 23, 1960, Ser. No. 57,934
Claims priority, application Germany Sept. 24, 1959
4 Claims. (Cl. 88—17)

The present invention relates to projectors. More in particular, the present invention relates to film guide means in cinematographic projectors with automatic threading of the film strip.

It is known to provide cinematographic projectors with means guiding the film strip in such manner that lateral deviations of the film strip are avoided. Such means may consist of a guide member adjacent to one edge of the film strip and resiliently urging the travelling film cinematographic strip against a fixed guide bar. In the absence of a film strip the resiliently positioned guide member projects into the path of a film strip, and it therefore becomes necessary to manually push back this guide member prior to the threading of a film strip and to release the guide member only when the strip has reached the guide member, whereupon the latter is released so as to come into pressure contact with the edge of the film strip.

It will be easily apparent that this manual operation of the guide member is undesirable, and it is therefore the object of the invention to provide guide means which reach a position in pressure contact with the film strip entirely automatically.

Another object of the invention is to provide guide means for a projector with automatic threading of the film which assures an accurate guiding of the film strip after the latter has been gripped and is being conveyed by the conventional gripper means. This accurate guiding is attained by applying lateral pressure to the film strip at a position close to and following the gripping position in the direction of travel of the film strip, thereby applying pressure to the film strip at a point where the film strip has a substantial degree of stiffness due to the gripping effect adjacent the point of pressure.

These objects are achieved by the film guide means of the present invention, according to which a pivotable pressure member is provided below the gripper means, in the direction towards the film take-up spool, which is urged by resilient means towards the path of the film strip so as to assume in the absence of the film strip a resting position partly projecting into the path of the film strip, whereas it is pushed back by the travelling film strip against the influence of the resilient means so as to assume an operative position wherein at least one contact portion is in pressure contact with the edge of the travelling film strip, urging the same against a guide rail adjacent the opposite edge of the film strip.

A very important and advantageous feature of the invention resides in the location of at least the contact portion of the pressure member which is located below the gripper. The automatically threaded film strip must be prevented from meeting any substantial resistance before it is firmly gripped by the gripper means and moved further onward. For that reason at least the contact portion of the pressure member is located below the gripper, so that the film strip encounters the resistance of the resiliently positioned pressure member only after it has been seized by the gripper means.

The pressure member may form a one-armed lever the free end of which has the contact portion projecting into the path of the absent film strip in the resting position and pressing against the edge of the travelling film strip in the operative position.

According to a preferred embodiment of the invention, the pressure member forms a two-armed lever, each lever arm having a contact portion, the lower one of which projects into the path of the absent film strip in the resting position, whereas in the operative position both contact portions are pressed against the travelling film strip.

The invention will be better understood upon the following description of the accompanying drawings, wherein FIGURE 1 is a side elevational view of a projector with the film guide means of the invention;

Figure 1:
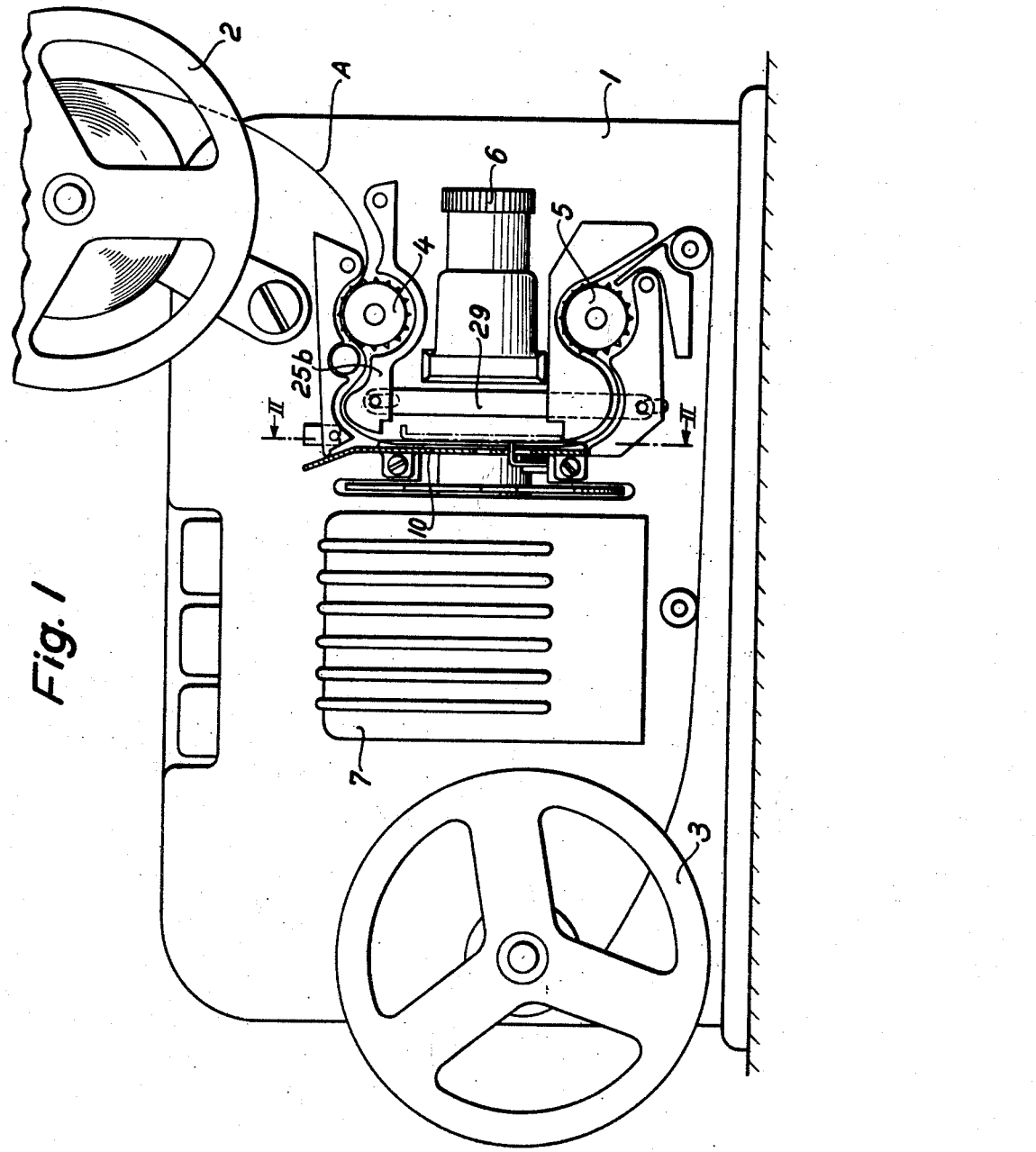

Referring to the drawings more in detail, FIGURE 1 illustrates a cinematographic projector having a suitable housing 1, supporting a pay-out spool 2 and a take-up spool 3. A first conveyor sprocket wheel 4 is associated with the pay-out spool, whereas a second conveyor sprocket wheel 5 is associated with the take-up spool 3. The housing 1 further supports an objective system 6 behind which is arranged a lamp casing 7. A first deflection guide means 8 is attached to casing 1 in order to guide the film strip A from pay-out spool 2 over sprocket wheel 4 to a guide unit 10 (with which latter the present invention is concerned) and a second deflection guide means is disposed below guide means for guiding the film strip A from guide unit 10 to sprocket wheel 5. A third deflection guide means 9a guides the film strip A from sprocket wheel 5 to take-up spool 3.

Figure 2:
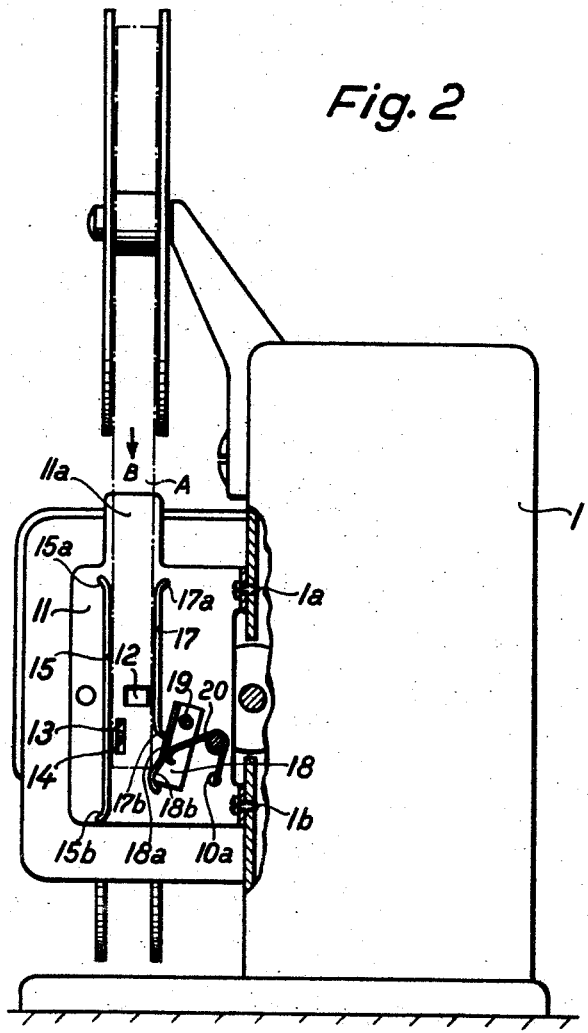
FIGURE 2 is a rear elevational view of a projector with one embodiment of the film guide means according to the invention.

Turning next to the guide unit according to the invention, illustrated in greater detail in FIGURE 2, there is provided a guide plate 11 attached to projector housing 1 e.g. by means of screws 1a, 1b and having a projecting portion 11a pointing in the direction of the path of film strip A arriving from pay-out spool 2. Guide plate 11 has an image aperture 12, and somewhat below the latter, an opening 13 through which projects a gripper 14 for gripping into conventional perforations of film strip A and moving it on in the direction indicated by arrow B. The openings 12 and 13 are flanked by a pair of guide rails 15 and 17, mounted on guide plate 11 and extending in parallel spaced relationship so as to define a path of travel for film strip A. The guide rails 15 and 17 may have bent end portions at either end, designated with 15a, 15b, and 17a, 17b, respectively, pointing away from the film strip A. These bent portions contribute to the accurate adjustment of film strip A on its defined path when travelling from the pay-out spool 2 to take-up spool 3.

Next to guide rail 17 guide plate 11 bears a fixed bearing stud 19. A pressure member 18 is pivotally positioned on bearing stud 19 having a flange portion 18a with contact portion 18b. Guide plate 11 also supports resilient means, such as pressure spring 20, urging pressure member 18 in the direction towards film strip A. In the absence of film strip A pressure member 18 is urged sufficiently far to project into the path of the film strip; according to an important feature of the invention the pressure member 18 is so positioned relative to gripper 14, that at least the contact portion 18b, which is to come into pressure engagement with the film strip, is located below the gripper means in the direction towards the take-up spool 3.

It will be noted that the pressure member 18 is designed for assuming a resting position, partly projecting into the path of the film strip, in the absence of the latter, and an operative position, wherein it is pushed back against the influence of spring 20 so as to be in pressure contact with the edge of the film strip.

Figure 4:
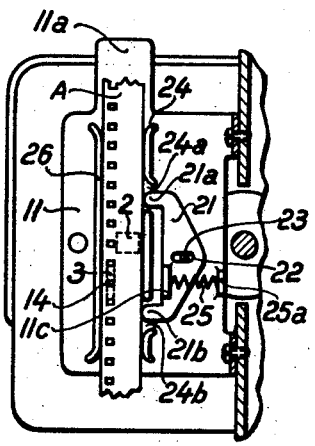
FIGURE 4 illustrates the guide means of FIGURE 3 in another position.
Figure 3:
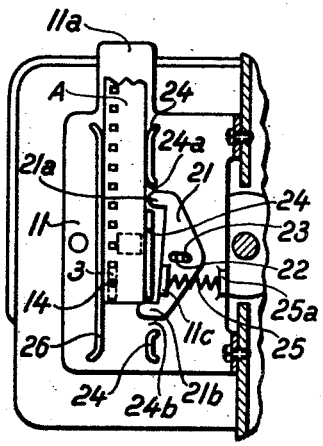
FIGURE 3 is a detailed view of another embodiment of the film guide means of the invention.

According to another embodiment of the invention, illustrated in FIGURES 3 and 4, a pressure member 21 is provided having, at either end, two projecting contact portions 21a, 21b, pointing towards the film strip A, and, in its central portion, a longitudinal slot 22 into which there projects a bearing stud 23 mounted on guide plate 11. The pressure member 21 thus forms a two-armed lever pivoting about bearing 23 as a fulcrum. The first guide rail 26 is identical with guide rail 15, whereas the second guide rail 24 has two openings 24a and 24b through which the contact portions 21a and 21b of pressure member 21 are allowed to project. A pressure spring 25 is fixed with one end to a base member 25a attached to the projector housing 1, whereas the other end is attached to the lower portion of pressure member 21, so as to urge this lower portion with the lower contact point 21b towards the film strip. It will be noted that the lower contact portion 21b is located below gripper 14, similar to the previously mentioned position of contact portion 18b of pressure member 18 of the embodiment shown in FIGURE 2. Furthermore, the slot 22 extends vertically relative to the direction of travel B of film strip A.

Similar to the pressure member 18 of the embodiment of FIGURE 2, the pressure member 21 is designed for assuming a resting position illustrated in FIGURE 3, in which the lower portion projects into the path of the film strip, and an operative position, as shown in FIGURE 4, wherein the two contact points 21a and 21b press against the edge of the film strip.

The embodiment illustrated in FIGURE 2 operates in the following manner:

The film strip A travels from pay-out spool 2 onto the projecting portion 11a of guide plate 11, and then passes between guide rails 15 and 17 over image aperture 12. The film strip is then gripped by gripper 14 and moved further, until it reaches the pressure member 18, reaching with its contact portion 18b into the path of the film strip; the pressure member is urged back against the force of spring 20, whereafter the pressure member exerts a constant and continuous lateral pressure against the film strip, thereby maintaining the travelling film in slight contact with guide rail 15.

The pressure member has thus been moved from its resting position to its operative position by the travelling film strip itself, after the strip has been gripped by gripper 14.

The embodiment illustrated in FIGURES 3 and 4 operates in an analogous manner. After the film strip has been gripped by gripper 14, the film strip pushes back contact point 21b, on the lower lever arm of pressure member 21. The pressure member then asssumes its operative position, shown in FIGURE 4, wherein both contact points 21a and 21b are in pressure contact with the film strip so as to slightly urge the same against guide rail 26.

The pressure member 21 thus has been moved from its resting position to its operative position by the travelling film strip itself, after the strip has been gripped by gripper 14.

It will be understood that this invention is susceptible to modification in order to adapt it to different usages and conditions and, accordingly, it is desired to comprehend such modifications within this invention as may fall within the scope of the appended claims.

What I claim is:

1. In a cinematographic projector guide means for a film strip comprising a guide plate, a pair of guide rails on said guide plate defining a path for a film strip, there being an image aperture and a second aperture in said guide plate, gripper means projecting through said second aperture and engaging the film strip for moving the film strip on said guide plate, a pressure member pivotally mounted at its central portion on said guide plate and having a first contact portion at one of its ends and a second contact portion at its opposite end, said second contact portion being located beyond said gripper means in the direction of travel of said film strip, said pressure member having a resting position and an operative position, and resilient means urging said pressure member towards the path of the film strip so that said second contact portion, in said resting position, projects into the path of the film strip in the absence of the latter, said second contact portion being moved back against the influence of said resilient means by the travelling film strip into said operative position wherein said first contact portion and said second contact portion are in pressure contact with the film strip so as to maintain the same on said path defined by said guide rails.

2. In a cinematographic projector guide means for a film strip comprising a guide plate, a pair of guide rails on said guide plate defining a path for a film strip, there being an image aperture and a second aperture in said guide plate, gripper means projecting through said second aperture and engaging the film strip for moving the film strip on said guide plate, a pressure member having centrally a longitudinal slot extending vertically relative to the direction of travel of the film strip and being pivotally mounted with said longitudinal slot on said guide plate and having a first contact portion at one of its ends and a second contact portion at its opposite end, said second contact portion being located beyond said gripper means in the direction of travel of said film strip, said pressure member having a resting position and an operative position, and resilient means urging said pressure member towards the path of the film strip so that said second contact portion, in said resting position, projects into the path of the film strip in the absence of the latter, said second contact portion being moved back against the influence of said resilient means by the travelling film strip into said operative position wherein said first contact portion and said second contact portion are in pressure contact with the film strip so as to maintain the same on said path defined by said guide rails.

3. In a cinematographic projector having a housing, a film pay-out spool and a film take-up spool, on said housing, guide means on said housing between said pay-out spool and said film take-up spool, comprising a guide plate, a pair of guide rails on said guide plate defining a path for a film strip, there being an image aperture and a second aperture in said guide plate, gripper means projecting through said second aperture and engaging the film strip for moving the film strip on said guide plate, a pressure member pivotally mounted at its central portion on said guide plate and having a first contact portion at one of its ends and a second contact portion at its opposite end, said second contact portion being located beyond said gripper means in the direction of travel of said film strip, said pressure member having a resting position and an operative position, and resilient means on said housing urging said second contact portion towards the path of the film strip so that said second contact portion, in said resting position, projects into the path of the film strip in the absence of the latter, said second contact portion being moved back against the influence of said resilient means by the travelling film strip into said operative position wherein said first contact portion and said second contact portion are in pressure contact with the film strip so as to maintain the same on said path defined by said guide rails.

4. In a cinematographic projector guide means for a film strip comprising a guide plate, a pair of guide rails on said guide plate defining a path for a film strip, there being an image aperture and a second aperture in said guide plate, gripper means projecting through said second aperture and engaging the film strip for moving the film strip on said guide plate, a pressure member having a first contact portion at one of its ends and a second contact portion at its opposite end, said second contact portion being located beyond said gripper means in the direction of travel of said film strip, means for mounting said pressure member on said guide plate for pivotal movement about its central portion and for transverse movement with respect to the path of said film strip, said pressure member having a resting position and an operative position, and resilient means urging said pressure member toward the path of the film strip so that said second contact portion, in said resting position, projects into the path of the film strip in the absence of the latter, said second contact portion being moved back against the influence of said resilient means by the travelling film strip into said operative position wherein said first contact portion and said second contact portion are in pressure contact with the film strip so as to maintain the same on said path defined by said guide rails.

References Cited in the file of this patent

UNITED STATES PATENTS

| | | |
|---|---|---|
| 1,437,895 | Horst | Dec. 5, 1922 |
| 1,884,609 | Dina | Oct. 25, 1932 |
| 1,966,684 | Pollock | July 17, 1934 |

FOREIGN PATENTS

| | | |
|---|---|---|
| 27,358 | Great Britain | Nov. 27, 1913 |
| 840,187 | Germany | May 29, 1952 |